Sept. 30, 1969 J. S. CHANDLER 3,469,899
CASE FOR A PROJECTION SCREEN
Filed Nov. 21, 1966 2 Sheets-Sheet 1
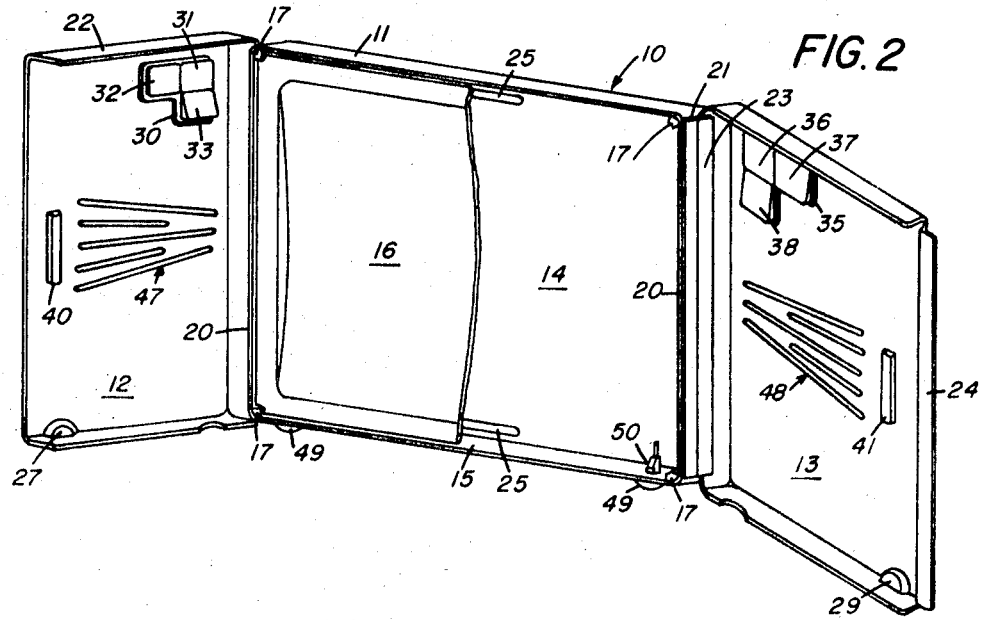
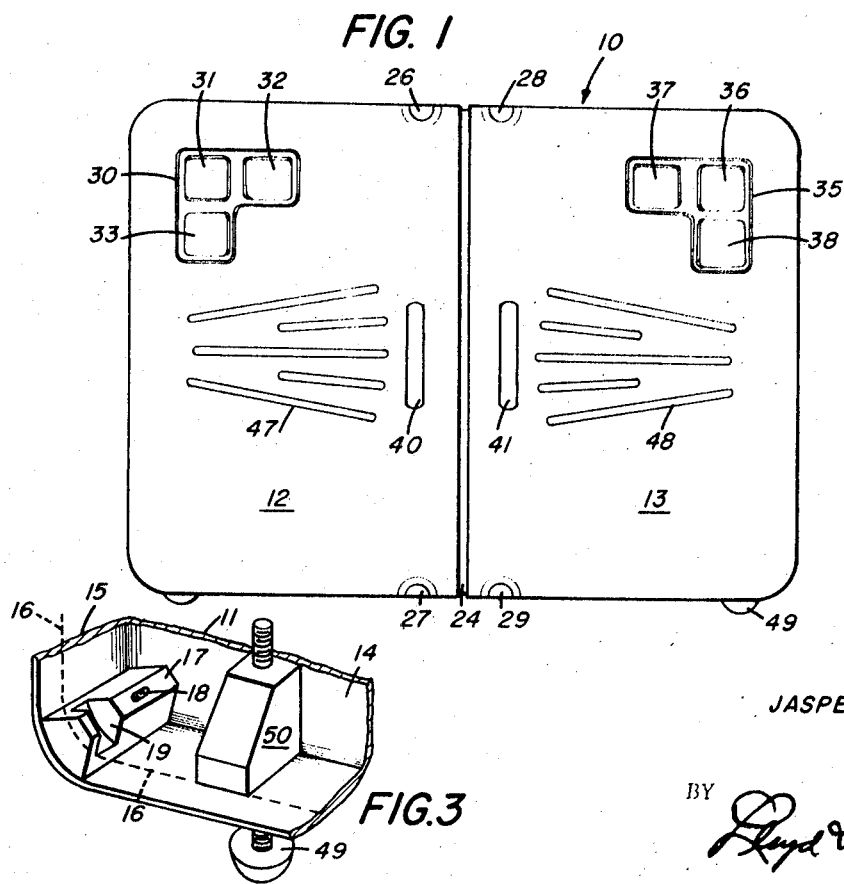
JASPER S. CHANDLER
INVENTOR.
BY
AGENT

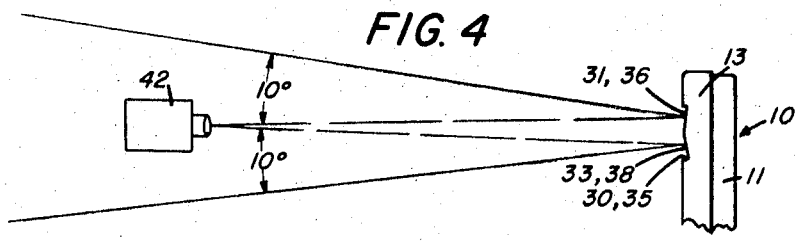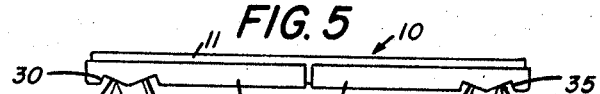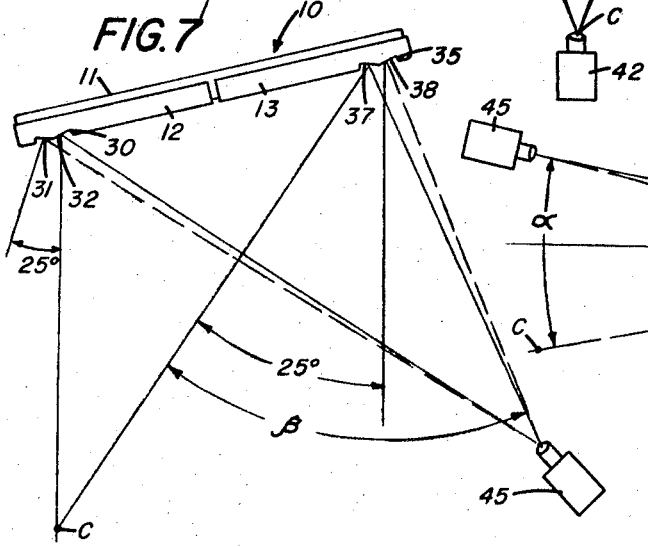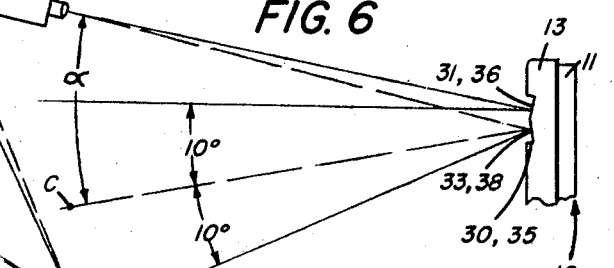

United States Patent Office 3,469,899
Patented Sept. 30, 1969

3,469,899
CASE FOR A PROJECTION SCREEN
Jasper S. Chandler, Rochester, N.Y., assignor to Eastman Kodak Company, Rochester, N.Y., a corporation of New Jersey
Filed Nov. 21, 1966, Ser. No. 595,676
Int. Cl. G03b 21/58
U.S. Cl. 350—123            12 Claims

ABSTRACT OF THE DISCLOSURE

A projection screen comprises a case having a main portion or support which is similarly larger than a screen and within the confines of which the screen is mounted. The main portion carries a pair of movable cover members each of which is hinged to an opposed side of the main portion for movement between a screen covering position and an open position. When the cover members are in the open position, a plurality of elongated angularly-spaced indicia on each of the cover members is used to establish the angular or tilt position of the screen relative to an audience space. When the cover members are in the screen covering position, reflecting surfaces or members on each cover member, which are disposed at an angle relative to their respective cover member as well as to each other, are used to establish the position of the screen relative to a projector and the audience space by the projected light reflected from the surfaces or members.

---

The present invention relates to a case for a projection screen and more particularly to such a case having means for adjusting the position of the screen relative to a projector and the audience space.

In U.S. patent application, Ser. No. 595,926, filed Nov. 11, 1966 in the names of Chandler et al. and entitled "Projection Screen," now U.S. Patent 3,408,132, a projection screen is disclosed in which a reflecting material is used which provides a narrow viewing angle with increased screen brightness. With the use of a screen having such a reflecting material, it is necessary that the position of the screen relative to the audience be established within relatively close limits so that the maximum screen brightness is presented to the audience.

While it is known in the prior art to provide various types of mounts for projection screens, such mounts are concerned primarily with maintaining the screen in a fixed position relative to the projector and audience. Further, such screens are usually of a size that do not permit their being dismantled for storage purposes. Those screens which can be dismantled are usually in the form of a roll screen as a matter of convenience and in this form are flat when in use and, hence, do not present the same problem in orienting the screen relative to a projector and an audience space because of the much larger viewing angles.

The primary object of the invention is to provide a support for a projection screen having means thereon for establishing the optimum position of the support, and hence the screen, relative to a projector and the audience space.

Another object of the invention is to provide a case for a projection screen having means thereon for establishing the position of the case, and hence the screen, relative to a projector and an audience space.

Another object of the invention is to provide a case for a projection screen which protects the screen surface from mechanical abrasion during handling and/or storage.

Still another object of the invention is to provide a case for a projection screen having means thereon for establishing the optimum position of the screen relative to the audience space in both a vertical and a horizontal direction as well as the center of the audience space.

Other objects and advantages of the case for a projection screen will be apparent to those skilled in the art by the description which follows.

The objects and advantages of the case for a projection screen to be described in more detail hereinafter are attained by a case comprising a main portion or support which is similarly larger than the screen and within the confines of which the screen is mounted. The main portion carries a pair of movable cover members, each of which is hinged to an opposed side of the main portion for movement between a screen-covering position and an open position. Each of the cover members is provided with means for use in establishing the optimum position of the case, and hence the screen, relative to the audience space by a projected light reflected from the screen when the cover members are in an open position and from reflecting surfaces on each cover member when the latter are in a screen-covering position. When the cover members are in the open position and substantially normal to the main portion, a plurality of elongated angularly-spaced indicia on each of the cover members is used to establish the angular or tilt position of the screen relative to the audience space. On the other hand, when the cover members are in the screen-covering position, reflecting surfaces or members on each cover member which are disposed at an angle relative to their respective cover member, as well as to each other, are used to establish the position of the screen relative to a projector and the audience space by the projected light reflected from the surfaces or members.

Reference is now made to the accompanying drawings wherein like reference numerals designate like parts and wherein:

FIG. 1 is a front elevational view of a case for a projection screen with the cover members in a screen-covering position;

FIG. 2 is a perspective view of the case shown in FIG. 1 with the cover members extended into an open position and showing the relation of the screen to the indicia on the cover members;

FIG. 3 is a partial perspective view of a corner of the case with the cover member removed and showing one of the members for supporting the screen and one of the adjustable posts;

FIG. 4 is a diagrammatic side elevational view showing the manner in which a pair of the reflecting surfaces on each cover member is used to establish the vertical angular limits of the screen for a given audience space and projector position;

FIG. 5 is a diagrammatic plan view showing the manner in which the same pair of reflecting surfaces is used to establish the horizontal angular limits of the screen as well as the center of the audience space for the same audience space and projector position as in FIG. 4; and FIGS. 6 and 7 are diagrammatic side elevational and plan views, respectively, showing the manner in which the reflecting surfaces are used when a projector is displaced from the center of the audience space in a vertical and horizontal direction, respectively.

With reference to FIGS. 1 and 2, the screen case 10 comprises a main portion 11 and a pair of cover members 12 and 13. The portion 11 comprises a support or back 14 having a peripheral extension or frame 15 within which a screen 16 can be mounted. The portion 11 is shown as being rectangular in shape and is similarly larger than the screen to be mounted therein. The portion 11 can be of any shape and, preferably, corresponds to that of the screen. In each corner of the portion 11, see FIG. 3, a block 17 is positioned by means of a screw 18 and is provided with a notch 19 for engaging the edge of the screen 16 to hold it in position within portion 11. Along each of the opposite edges 20 of extension 15, a hinge 21 is secured to the extension 15. One of hinges 21 is secured to an extension 22 on cover member 12 and the other hinge 21 is secured to an extension 23 on cover member 13. The extensions 22 and 23 are arranged along three edges of and integral with each respective cover member and normally overlie the extension 15. Cover member 13 is provided with a lip 24 against which cover member 12 lies when the cover members are in the screen-covering position as shown in FIG. 1. While the case 10 comprises a preferably arrangement for establishing the optimum position of screen 16, a support without cover members 12 and 13 could also be used.

The main portion 11 is provided with finger grips 25, as shown in FIG. 2 for carrying the case 10. Each of the cover members 12 and 13 is provided with a pair of recesses 26–27 and 28–29, respectively, which engage opposite edges of the extension 15 to locate the cover members relative thereto. A finger recess 40, 41 is provided in each respective cover member for moving the latter between the screen-covering and open positions.

In the upper left-hand corner of cover member 12 a recess 30 is formed which comprises surfaces 31, 32 and 33 which are arranged at different angles relative to the plane of the cover member and to each other in accordance with the determined maximum viewing angles in a vertical and horizontal direction. Each of surfaces 31, 32 and 33 can be metallized to provide a reflecting surface, or can have relatively thin, plano or concave mirrors affixed thereto. A similar recess 35 comprising surfaces 36, 37 and 38 is arranged in the upper right-hand corner of cover member 13. The angles of surfaces 36, 37 and 38 relative to cover member 13 and to each other are the same as surfaces 31, 32 and 33, respectively, but of opposite hand. As noted above, the surfaces 31–33 and 36–38 can also be incorporated in a support without cover members with such surfaces arranged outside of the screen-reflecting surface.

When the case 10 with the cover members 12 and 13 in their screen-covering position is arranged relative to a projector 42, the surfaces 31–33 and 36–38 are used in pairs to define the audience space in a vertical and horizontal direction as well as the center of the audience space, see FIGS. 4 and 5. The projected light incident on each of surfaces or mirrors 31 and 36 is reflected upwardly as a small beam of light to provide an upper vertical guide limit. The light incident on surfaces 33 and 38 is reflected downwardly (33, 38), to the right (38) and to the left (33), thereby indicating the limit in each respective direction. The light from surfaces 32 and 37 is reflected to a common point which is the center C of the audience space and, depending on the position of projector 42 may or may not generally coincide with the projector position. The surfaces 31–33 and 36–38 are arranged, preferably, at angles which will provide angular limits of ±10° in a vertical direction and of ±25° in a horizontal direction relative to the normal of the screen 16. The mirrors 32 and 37 which converge the projected beam of light toward the center of the audience space locate the ideal viewing position.

In FIGS. 6 and 7 a projector 45 is shown as being displaced in both a horizontal (FIG. 7) and a vertical (FIG. 6) direction relative to the center C of the audience space. The case 10 is then adjusted angularly until the beams of light reflected from surfaces 32 and 37 meet at point C, the center of the audience. In this position of the case 10, the beams reflected from the surfaces or mirrors 31, 33, 36 and 38 will then define the vertical and horizontal limits of the audience space relative to such a displaced projector.

After the case 10 has been positioned or angularly aligned with the projector, the cover members 12, 13 are moved to an open position in which they are substantially normal to the main portion 11 as shown in FIG. 2, although to an exaggerated extent for clarity. Each of the cover members 12 and 13 is provided with a set of indicia, which can be of any suitable form but are, preferably, angularly arranged, elongated members 47, 48 for establishing the correct tilt of the screen 16 in a vertical direction. The members 47, 48 are formed in 5° increments from the normal to the center of the screen and can be used to establish the tilt of screen 16 in a vertical direction. When the cover members are in their open position, it is then determined which of the members 47, 48 is directed toward the projector lens. The complementary member 47, 48 then indicates the center C of the audience space in the vertical direction. For example, if the projector is determined as being 5° above normal, the center of the audience space is then 5° below normal. The members 47, 48 are preferably elongated as shown to increase the rigidity of the cover members as well as to provide means for establishing the tilt of the projection screen. However, the members 47, 48 can be discrete parts that are secured to the cover members or can take other forms which will provide the same result.

The case 10 is tilted by moving portion 11 relative to the forward ends of the cover members, when the latter are in an open position, by adjusting the posts or feet 49. Each of the posts 49 threadably engage a block 50 that is secured to the support 14 and extension 15 adjacent each lower corner of portion 11, see FIG. 3. The blocks 50 are arranged behind the plane of screen 16 as determined by slots 19 in blocks 17.

The case 10 is preferably made of a plastic material which is light in weight and possesses sufficient rigidity to support the screen 10. The use of a plastic material lends itself to the molding of surfaces 31–33 and 36–38, as well as members 47, 48 as integral parts of each respective cover member. However, other materials can be used with the reflecting surfaces and indicia or elongated members being separate from the cover but fixed thereto by suitable means to provide the same function and purpose.

The invention has been described in detail with particular reference to preferred embodiments thereof, but it will be understood that variations and modifications can be effected within the spirit and scope of the invention.

I claim:
1. A projection screen comprising:
   a support for said screen; and
   at least two horizontally-spaced pairs of vertically-spaced reflecting surfaces on said support disposed in predetermined angular relationship to said screen for establishing the optimum angular position of said screen relative to a projector and an audience space in both a horizontal and vertical direction by the projected light reflected from each pair of said reflecting surfaces.
2. A case for a projection screen comprising:
   a main portion similarly larger than said screen and within the confines of which said screen is mounted;
   a pair of cover members, each of which is hinged to an opposed side of said main portion for movement between a screen-covering position and an open position; and
   at least one reflecting surface on each of said cover members that is angularly disposed relative to the plane of its respective cover member for establishing the optimum angular position of said screen relative to a projector and an audience space in a vertical direction by the projected light reflected from said surfaces when said cover members are in said covering position.
3. A case in accordance with claim 2 wherein each of said cover members includes at least one reflecting surface that is angularly disposed relative to the plane of its respective cover member for establishing the optimum angular position of said screen relative to the audience space in a horizontal direction by the projected light reflected from said surfaces when said cover members are in said covering position.

4. A case in accordance with claim 1 wherein each of said cover members includes at least a pair of vertically spaced reflecting surfaces, said surfaces on each respective cover member being disposed at different angles relative to the plane of its respective cover member for establishing the optimum angular position of said screen relative to the audience space in both a horizontal and a vertical direction by the projected light reflected from said surfaces when said cover members are in said covering position.

4. A case in accordance with claim 2 wherein each of said cover members includes a third reflecting surface adjacent said pair of reflecting surfaces, each of said third reflecting surfaces being disposed at an angle relative to its respective cover member for establishing the aproximate center of said audience space by the projected light reflected from said third surface when said cover members are in said covering position.

6. A case in accordance with claim 2 wherein each of said cover members includes at least a pair of vertically spaced and angularly disposed surfaces and a reflecting member secured to each of said surfaces, whereby each of said reflecting members is disposed at a different angle relative to its respective cover member for establishing the optimum angular position of said screen relative to the audience space in both a horizontal and a vertical direction by the projected light reflected from said reflecting members when said cover members are in said covering position.

7. A case in accordance with claim 6 wherein each of said cover members includes at least a third surface angularly disposed adjacent said pair of surfaces and a third reflecting member secured to each of said third surfaces, whereby each of said third members is angularly disposed relative to its respective cover member for establishing the approximate center of the audience space by the projected light reflected from said third reflecting members when said cover members are in said covering position.

8. A case in accordance with claim 7 wherein said reflecting members are concave mirrors.

9. A case in accordance with claim 2 wherein at least one of said cover members includes a plurality of spaced indicia for establishing the angular position of said screen relative to the audience space by the projected light reflected from said screen when said cover members are in said open position and substantially normal to said main portion.

10. A case in accordance with claim 2 wherein each of said cover members includes a plurality of elongated, angularly spaced indicia, said indicia diverging in a vertical direction from the horizontal center line of said main portion for establishing the angular position of said screen relative to the audience space by the projected light reflected from said screen when said cover members are in said open position and substantially normal to said main portion.

11. A case in accordance with claim 10 wherein said indicia are elongated members that are integral with each respective cover member.

12. A case in accordance with claim 11 wherein said elongated members on each of said cover members comprise a median designating member between at least a pair of angular designating members.

References Cited

UNITED STATES PATENTS

| | | | |
|---|---|---|---|
| 536,790 | 4/1895 | Shiras | 240—1.3 |
| 2,867,045 | 1/1959 | Millgate | 350—117 |
| 3,205,772 | 9/1965 | Guske | 350—117 |

NORTON ANSHER, Primary Examiner

RICHARD L. MOSES, Assistant Examiner

U.S. Cl. X.R.

350—299